(12) United States Patent
Huang et al.

(10) Patent No.: US 10,305,301 B2
(45) Date of Patent: May 28, 2019

(54) BATTERY AND ELECTRONIC DEVICE THEREOF

(71) Applicant: Lenovo (Beijing) Co., Ltd., Beijing (CN)

(72) Inventors: Baoning Huang, Beijing (CN); Bingcai Luo, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 46 days.

(21) Appl. No.: 15/496,081

(22) Filed: Apr. 25, 2017

(65) Prior Publication Data

US 2018/0006475 A1  Jan. 4, 2018

(30) Foreign Application Priority Data

Jun. 30, 2016  (CN) .......................... 2016 1 0513985

(51) Int. Cl.
| | |
|---|---|
| *H02J 7/00* | (2006.01) |
| *H01M 10/42* | (2006.01) |
| *H01M 10/44* | (2006.01) |
| *H01M 10/46* | (2006.01) |
| *H01M 10/48* | (2006.01) |

(52) U.S. Cl.
CPC ......... *H02J 7/0031* (2013.01); *H01M 10/425* (2013.01); *H01M 10/4257* (2013.01); *H01M 10/44* (2013.01); *H01M 10/46* (2013.01); *H01M 10/48* (2013.01); *H02J 7/008* (2013.01); *H02J 7/0029* (2013.01); *H02J 7/0045* (2013.01); *H01M 2010/4271* (2013.01); *H02J 2007/0037* (2013.01); *Y02B 40/90* (2013.01)

(58) Field of Classification Search
CPC ........ H02J 7/0031; H02J 7/008; H02J 7/0029; H02J 7/0045; H01M 10/425; H01M 10/48
USPC .......................................................... 320/134
See application file for complete search history.

(56) References Cited

U.S. PATENT DOCUMENTS

| | | | | |
|---|---|---|---|---|
| 5,530,336 A | * | 6/1996 | Eguchi ................. | H02J 7/0013 320/118 |
| 5,748,083 A | * | 5/1998 | Rietkerk .............. | G08B 13/128 340/568.2 |
| 5,994,878 A | * | 11/1999 | Ostergaard ............ | H02J 7/0004 320/132 |
| 6,492,058 B1 | * | 12/2002 | Watanabe ........... | H01M 2/1061 429/121 |
| 9,837,811 B2 | * | 12/2017 | Yamaguchi ........... | H01M 10/44 |
| 2006/0139008 A1 | * | 6/2006 | Park .................... | H01M 10/482 320/134 |

(Continued)

FOREIGN PATENT DOCUMENTS

| | | |
|---|---|---|
| CN | 101916983 A | 12/2010 |
| CN | 103427131 A | 12/2013 |

(Continued)

*Primary Examiner* — M Baye Diao
(74) *Attorney, Agent, or Firm* — Anova Law Group, PLLC (57) ABSTRACT

A battery and an electronic device are provided. The battery includes a battery cell, including at least one anode of the battery cell and at least one cathode of the battery cell. The battery also includes a voltage detection circuit, wherein the voltage detection circuit detects a voltage of the battery cell. Further, the battery includes a protection circuit, wherein the protection circuit protects the battery cell based on the voltage of the battery cell detected by the voltage detection circuit.

17 Claims, 5 Drawing Sheets

(56) References Cited

U.S. PATENT DOCUMENTS

| | | | | |
|---|---|---|---|---|
| 2012/0249087 | A1* | 10/2012 | Kimura | H02H 7/18 |
| | | | | 320/164 |
| 2012/0293125 | A1* | 11/2012 | Suzuki | H01M 10/441 |
| | | | | 320/116 |
| 2013/0163134 | A1* | 6/2013 | Ji | H01M 10/42 |
| | | | | 361/86 |
| 2013/0171481 | A1* | 7/2013 | Hotta | H01M 10/4207 |
| | | | | 429/50 |
| 2013/0221924 | A1* | 8/2013 | Sim | H02J 7/0063 |
| | | | | 320/112 |
| 2013/0229151 | A1* | 9/2013 | Okada | H01M 10/44 |
| | | | | 320/112 |
| 2013/0241491 | A1* | 9/2013 | Hu | H02J 7/0004 |
| | | | | 320/118 |
| 2015/0207349 | A1* | 7/2015 | Miyajima | H02J 7/0063 |
| | | | | 320/118 |
| 2018/0006337 | A1* | 1/2018 | Huang | H01M 10/446 |

FOREIGN PATENT DOCUMENTS

| | | |
|---|---|---|
| CN | 103904698 A | 7/2014 |
| CN | 105021998 A | 11/2015 |

\* cited by examiner

Figure 8 ated voltage is often inaccurate. Because of the voltage division of the protective package, the actual voltage of the battery cell is generally less than the detected voltage.

BATTERY AND ELECTRONIC DEVICE THEREOF

CROSS-REFERENCES TO RELATED APPLICATIONS

This application claims the priority of Chinese patent application No. 201610513985.7, filed on Jun. 30, 2016, the entirety of which is incorporated herein by reference.

FIELD OF THE DISCLOSURE

The present disclosure generally relates to the field of electronic technology and, more particularly, relates to a battery and an electronic device thereof.

BACKGROUND

With the rapid development of electronic technology, the variety of electronic devices is increasing. For example, mobile phones, tablet computers (PAD), smart wearable devices and other portable devices have been quite popular. For example, the mobile phone has almost become an indispensable electronic device that people carry. As the functions provided by the electronic devices have become richer and richer, power consumption of the electronic devices is also increasing, and requirements on the battery capacity of the electronic devices are getting higher and higher. Taking into account the size requirement of the electronic devices, the battery of the electronic devices generally should not be made too large. To meet users' needs for conveniently using the electronic devices, a fast charging technology has been developed. The battery may be quickly charged through the fast charging technology and, thus, the charging time can be reduced.

Charging the battery is actually charging a battery cell in the battery. The fast charging is to input a large constant current into the battery cell to quickly increase the voltage of the battery cell, thereby the purpose of the fast charging is achieved. After detecting that the voltage value of the battery cell reaches a certain value (for example, 4.2 volts), the fast charging process is ended and, to maintain the stability of the voltage of the battery cell and to protect the battery cell, the charging process is changed to charging with a constant voltage (for example, 4.2 volts). In other words, the large current fast charging process is changed to a constant voltage charging process.

Figure 1:
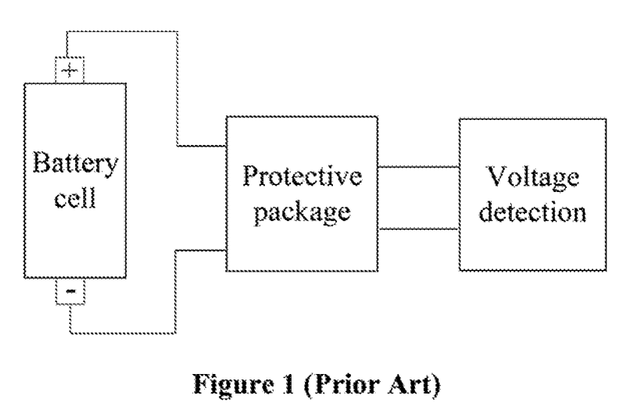
FIG. 1 illustrates a structural diagram of an existing battery.

Thus, when to end the fast charging process is determined based on the detected voltage value of the battery cell. For example, the fast charging process is ended after detecting that the voltage value of the battery cell reaches 4.2 volts. In practice, the battery generally includes a protection package, such as a protection circuit. Referring to FIG. 1, because the protection package itself has an internal resistance, the detected voltage is actually equivalent to the sum of the voltage of the battery cell and the voltage of the protective package. Therefore, the detection result for the actual voltage of the battery cell is often inaccurate. Because of the voltage division of the protective package, the actual voltage of the battery cell is generally less than the detected voltage.

Thus, the fast charging process may be prematurely ended, and the fast charging capability of the electronic device cannot be fully used. Therefore, the charging efficiency is reduced. The disclosed battery and electronic device are directed to solve one or more problems set forth above and other problems.

BRIEF SUMMARY OF THE DISCLOSURE

A first aspect of the present disclosure includes a battery. The battery includes a battery cell, including at least one anode of the battery cell and at least one cathode of the battery cell. The battery also includes a voltage detection circuit, wherein the voltage detection circuit detects a voltage of the battery cell. Further, the battery includes a protection circuit, wherein the protection circuit protects the battery cell based on the voltage of the battery cell detected by the voltage detection circuit.

A second aspect of the present disclosure includes an electronic device. The electronic device includes a battery. The battery includes a battery cell, including at least one anode of the battery cell and at least one cathode of the battery cell. The battery also includes a voltage detection circuit, wherein the voltage detection circuit detects a voltage of the battery cell. Further, the battery includes a protection circuit, wherein the protection circuit protects the battery cell based on the voltage of the battery cell detected by the voltage detection circuit. The electronic device also includes a power management chip, connected to the battery and for determining voltage detected by the voltage detection circuit as voltage of the battery.

Other aspects of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The disclosed embodiments in the present disclosure are merely examples for illustrating the general principles of the invention. Any equivalent or modification thereof, without departing from the spirit and principle of the present invention, falls within the true scope of the present invention.

Moreover, in the present disclosure, the term "and/or" may be used to indicate that two associated objects may have three types of relations. For example, "A and/or B" may represent three situations: A exclusively exists, A and B coexist, and B exclusively exists. In addition, the character "/" may be used to indicate an "exclusive" relation between two associated objects.

Figure 2:
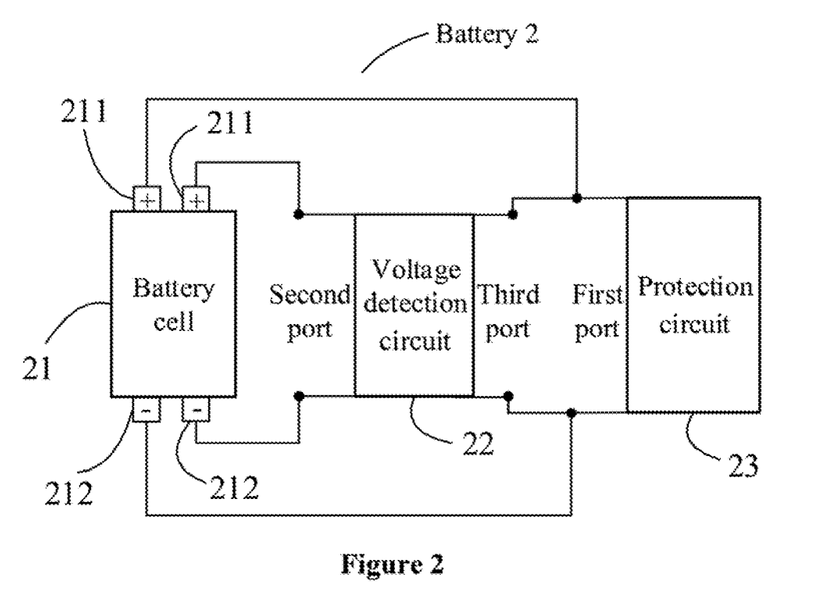
FIG. 2 illustrates a structural diagram of a battery consistent with disclosed embodiments.

The present disclosure provides an improved battery and electronic device. Referring to FIG. 2, a battery 2 may be provided. The battery 2 may be used in an electronic device, such as a mobile phone, a tablet computers (PAD), a personal digital assistants (PDA), a smart watch, and a smart hand ring, etc. The battery 2 may be a rechargeable battery, such as a lithium ion battery, a nickel-cadmium battery, a nickel-hydrogen battery, a lithium polymer battery, and a lead-acid battery, etc. Depending on the difference of the electronic devices where the battery 2 is used, the battery 2 may refer to a battery corresponding to the type of the electronic device. For example, the battery 2 may be the lithium ion battery commonly used in current electronic devices.

Referring to FIG. 2, the battery 2 may include a battery cell 21, a voltage detection circuit 22, and a protection circuit 23. The battery cell 21 may include at least one anode 211 of the battery cell and at least one cathode 212 of the battery cell. In one embodiment, the number of the anodes 211 may be equal to or different from the number of the cathodes 212.

For example, the battery cell 21 may include one anode 211 and one cathode 212, or the battery cell 21 may include two anodes 211 and two cathodes 212. In this case, the number of the anodes 211 may be equal to the number of the cathodes 212. For another example, the battery cell 21 may include one anode 211 and two cathodes 212, or the battery cell 21 may include two anodes 211 and one cathode 212. In this case, the number of the anodes 211 may be different from the number of the cathodes 212. Referring to FIG. 2, the battery cell 21 including two anodes 211 and two cathodes 212 is described herein as an example.

A first anode 211 of the battery cell and a second anode 211 of the battery cell described later may be any one anode 211 from the at least one anode 211 of the battery cell. A first cathode 212 of the battery cell and a second cathode 212 of the battery cell described later may be any one cathode 212 from the at least one anode 212 of the battery cell. The first anode 211 may be the same as or different from the second anode 211. The first cathode 212 may be the same as or different from the second cathode 212.

A plurality of electrodes of the battery cell 21 may be placed close to each other. Referring to FIG. 2, the two anodes 211 and the two cathodes 212 included in the battery cell 21 may be placed close to each other. For example, all the electrodes of the battery cell may be placed at the upper portion of the battery cell 21 shown in FIG. 2. For another example, referring to FIG. 2, the anodes 211 may be placed at the top portion of the battery cell 21, and the cathodes 212 may be placed at the bottom portion of the battery cell 21.

In actual applications, the anode 211 of the battery cell and the cathode 212 of the battery cell may be conductive contact points, and the conductive contact points may be made of copper, aluminum, or other conductive materials. For example, the anode 211 of the battery cell and the cathode 212 of the battery cell may be made of a current commonly used material. The potential difference between the anode 211 of the battery cell and the cathode 212 of the battery cell may refer to the voltage of the battery cell 21.

Referring to FIG. 2, the voltage detection circuit 22 may include a second port and a third port. The second port may be directly connected between the second anode 211 of the battery cell and the second cathode 212 of the battery cell. In other words, the second port of the voltage detection circuit 22 may be directly connected between the anode and cathode of the battery cell. Therefore, the voltage detection circuit 22 may detect the potential difference between the second anode 211 of the battery cell and the second cathode 212 of the battery cell to obtain the voltage of the battery cell 21. Thus, the detection of the voltage of the battery cell 21 may be realized.

Because the connection path between the voltage detection circuit 22 and the battery cell 21 does not include any other electronic components or circuit modules, the voltage of the battery cell 21 may not be divided between the voltage detection circuit 22 and the battery cell 21. Therefore, the voltage of the battery cell 21 detected by the voltage detection circuit 22 may be the actual voltage of the battery cell 21, in other words, the real voltage of the battery cell 21. However, in actual applications, the voltage detection circuit 22 may maintain electrical connection to the battery cell 21 through a conductive wire. Because an internal resistance of the conductive wire is generally small, the internal resistance of the conductive wire may be ignored at this time. In other words, the voltage division of the conductive wire to the battery cell 21 may be ignored.

The protection circuit 23 may include a first port, and the first port may be connected between the first anode 211 of the battery cell and the first cathode 212 of the battery cell. In other words, the protection circuit 23 may be connected between the anode and cathode of the battery cell 21. The protection circuit 23 may be used to perform real-time protection on the battery cell 21 according to the voltage of the battery cell 21 detected by the voltage detection circuit 22.

When performing a charging process on the battery 2, a charging current may be directly inputted into the battery cell 21 through the protection circuit 23 to increase the voltage of the battery cell 21. For example, a large constant current (for example, 800 mA) may be inputted to charge the battery cell 21 and to increase the voltage of the battery cell 21. When the voltage value of the battery cell 21 reaches a certain value (for example, 4.2 volts), indicating that the battery cell 21 may be already fully charged. At this time, if the battery cell 21 is still charged through a current of 800 mA, the battery cell 21 may be overvoltage, so as to further cause damages on the battery cell 21. Therefore, the charging current may need to be reduced. The function of the protection circuit 23 may refer to performing control on the inputted charging current. The charging current may be controlled based on the voltage of the battery cell 21 and, thus, the battery cell 21 may be charged through an appropriate current based on different states of the battery cell 21. Therefore, under the premise of ensuring high charging efficiency, the battery cell 21 may be protected to extend the service life of the battery cell 21.

The embodiments described above illustrate the overcharging protection on the battery cell 21. In actual applications, over-discharging protection, overcurrent protection and short circuit protection may also be involved. Other protection types can refer to current general approaches, and are not described one by one herein.

Referring to FIG. 2, the third port of the voltage detection circuit 22 may be directly connected to the first port of the protection circuit 23. After the voltage detection circuit 22 detects the voltage of the battery cell 21, the detected voltage of the battery cell 21 may be directly sent to the protection circuit 23 and, thus the protection circuit 23 may perform a corresponding control on the charging current or the discharging current based on the voltage value of the battery cell 21. Thus, overcharge or over-discharge of the battery cell 21 may be avoided to protect the battery cell 21.

Because the voltage detection circuit 22 is directly connected between the anode and cathode of the battery cell 21, the voltage value of the battery cell 21 detected by the voltage detection circuit 22 can truly reflect the actual voltage of the battery cell 21. Thus, the corresponding control operation performed by the protection circuit 23 based on the voltage detected by the voltage detection circuit 22 may be more accurate. Instead of having a voltage division of other electronic components between the battery cell 21 and the voltage detection circuit 22, the voltage detected by the method shown in FIG. 2 may be smaller and may be closer to the actual voltage of the battery cell 21. Thus, the detection result of the voltage of the battery cell 21 may be more accurate. For example, during the fast charging process, the time to end the fast charging process controlled by the protection circuit 23 based on the voltage detected by the voltage detection circuit 22 may be delayed a little longer and, thus, the fast charging capability of the battery 2 can be used as much as possible to maximize the charging efficiency.

Similar to the fast charging process, when the battery cell 21 undergoes the discharging process, the battery cell 21 may be controlled to stop outputting current in advance and, thus, the battery cell 21 may not be excessively consumed to extend the service life of the battery cell 21.

For at least one anode 211 and at least one cathode 212 included in the battery cell 21, the potential difference between any one anode 211 and any one cathode 212 may be equal. In other words, the potential difference between any one anode 211 of the battery cell and any one cathode 212 of the battery cell may refer to the voltage of the battery cell 21, and the potential difference between any one anode 211 of the battery cell and any one cathode 212 of the battery cell should be equal. Therefore, in one embodiment, the first anode 211 of the battery cell and the second anode 211 of the battery cell may be the same anode 211 of the battery cell, or may be different anodes 211 of the battery cell. In other words, the first anode 211 of the battery cell may be the same as or different from the second anode 211 of the battery cell. Similarly, the first cathode 212 of the battery cell may be the same as or different from the second cathode 212 of the battery cell.

Figure 3A:
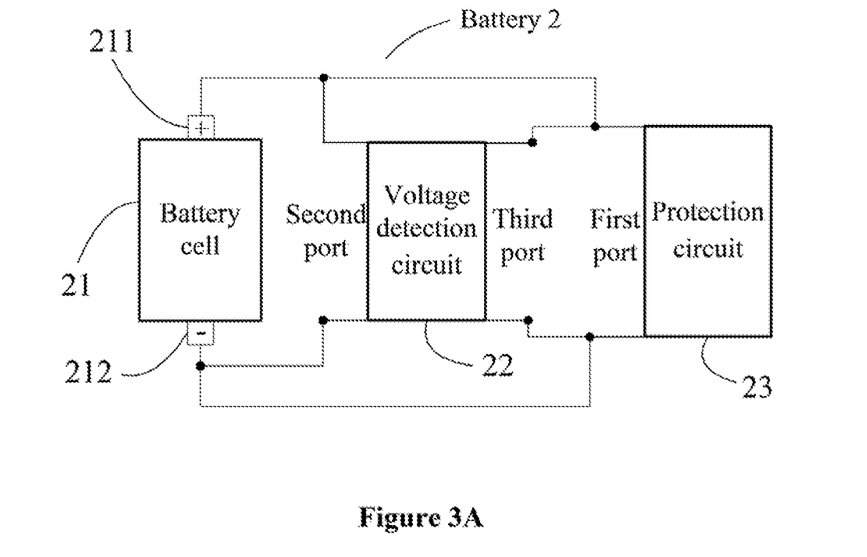
FIG. 3A illustrates a structural diagram of a battery where a first anode of a battery cell and a second anode of the battery cell are the same anode of the battery cell consistent with disclosed embodiments.

In one embodiment, when the first anode 211 of the battery cell is the same as the second anode 211 of the battery cell, in other words, when the first anode 211 of the battery cell and the second anode 211 of the battery cell are the same anode 211 of the battery cell. For example, referring to FIG. 3A, the battery cell 21 may be assumed to include only one anode 211 of the battery cell at this time. Further, FIG. 3A also illustrates a case where the first cathode 212 of the battery cell and the second cathode 212 of the battery cell may be the same cathode 212 of the battery cell and the battery cell 21 may include only one cathode 212 of the battery cell.

Figure 3B:
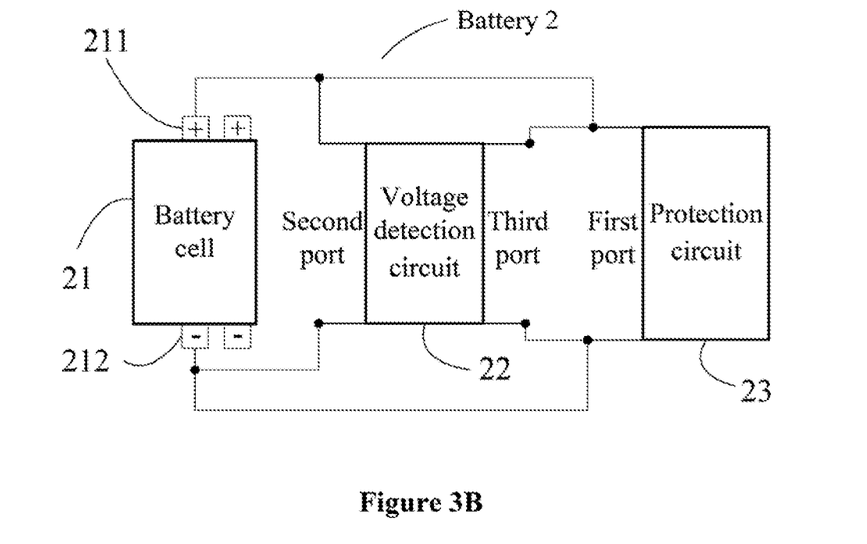
FIG. 3B illustrates a structural diagram of a battery including two anodes of the battery cell consistent with disclosed embodiments.

In another embodiment, when the first anode 211 of the battery cell and the second anode 211 of the battery cell are the same anode 211 of the battery cell, the battery cell 21 may include a plurality of anodes 211 of the battery cell. For example, referring to FIG. 3B, the battery cell 21 may include two anodes 211 of the battery cell, while the first anode 211 of the battery cell and the second anode 211 of the battery cell may be the same and be one of the two anodes 211 of the battery cell. Similarly, the battery cell 21 may include two cathodes 212 of the battery cell, while the first cathode 212 of the battery cell and the second cathode 212 of the battery cell may be the same and be one of the two cathodes 212 of the battery cell.

Figure 3C:
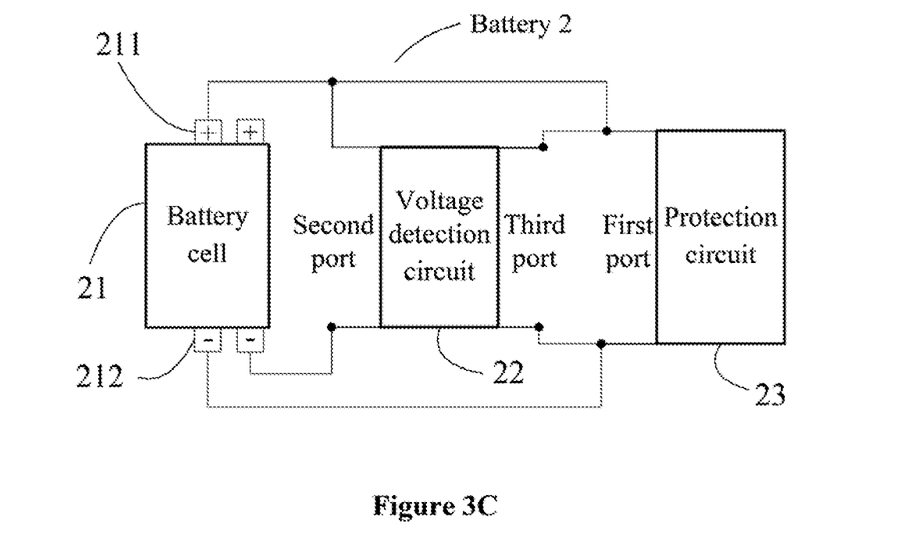
FIG. 3C illustrates a structural diagram of a battery where a first anode of a battery cell is the same as a second anode of the battery cell while a first cathode of the battery cell is different from a second cathode of the battery cell consistent with disclosed embodiments.

In another embodiment, referring to FIG. 3C, the first anode 211 of the battery cell may be the same as the second anode 211 of the battery cell, while the first cathode 212 of the battery cell may be different from the second cathode 212 of the battery cell. Alternatively, similar to the case shown in FIG. 3C, the first anode 211 of the battery cell may be different from the second anode 211 of the battery cell, while the first cathode 212 of the battery cell may be the same as the second cathode 212 of the battery cell.

When the first anode 211 of the battery cell and the second anode 211 of the battery cell are the same anode 211 of the battery cell, the battery cell 21 may include only one anode 211 of the battery cell. As a result, the integration of the battery cell 21 may be higher, and the material consumed by the production of electrodes may be economized to reduce the cost. When the first anode 211 of the battery cell and the second anode 211 of the battery cell are different anodes 211 of the battery cell, the voltage detection circuit 22 and the protection circuit 23 may be connected to the battery cell 21 through different electrodes of the battery cell. Thus, the circuit modules included in the battery 2 may be respectively connected to the battery cell 21 to facilitate performing separate control and management of each circuit module.

Figure 4:
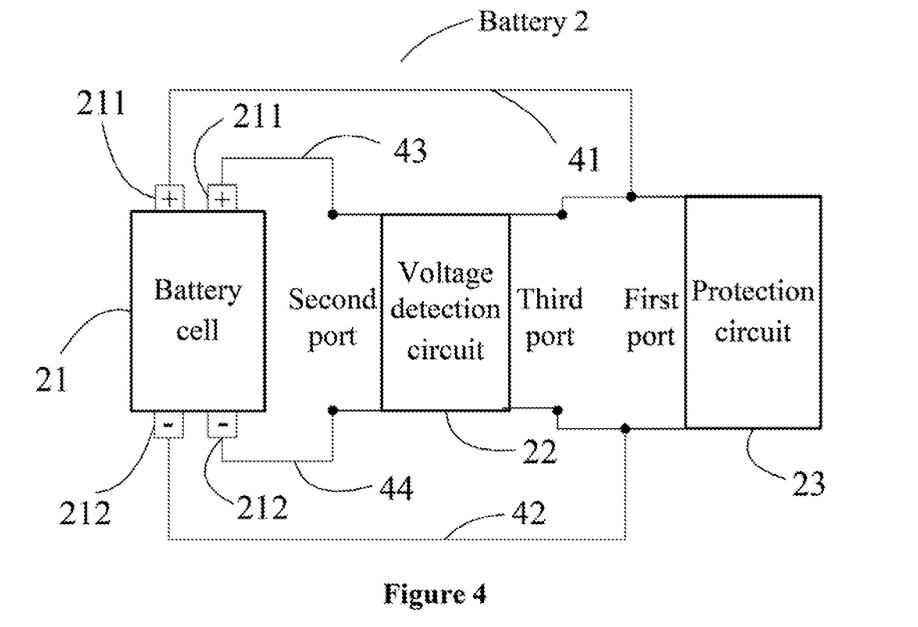
FIG. 4 illustrates a structural diagram of another battery consistent with disclosed embodiments.

In one embodiment, referring to FIG. 4, a first terminal of the first port of the protection circuit 23 may be connected to the first anode 211 of the battery cell through a first conductive wire 41, and a second terminal of the first port of the protection circuit 23 may be connected to the first cathode 212 of the battery cell through a second conductive wire 42. A first terminal of the second port of the voltage detection circuit 22 may be connected to the second anode 211 of the battery cell through a third conductive wire 43, and a second terminal of the second port of the voltage detection circuit 22 may be connected to the second cathode 212 of the battery cell through a fourth conductive wire 44.

The first conductive wire 41, the second conductive wire 42, the third conductive wire 43, and the fourth conductive wire 44 may be made of a same material or different materials. For example, to ensure every conductive wire have the same electrical characteristics, the above four conductive wires may be made of the same material. In actual applications, the material for making the above four conductive wires are not specifically limited as long as the electrical transmission can be ensured.

Figure 5:
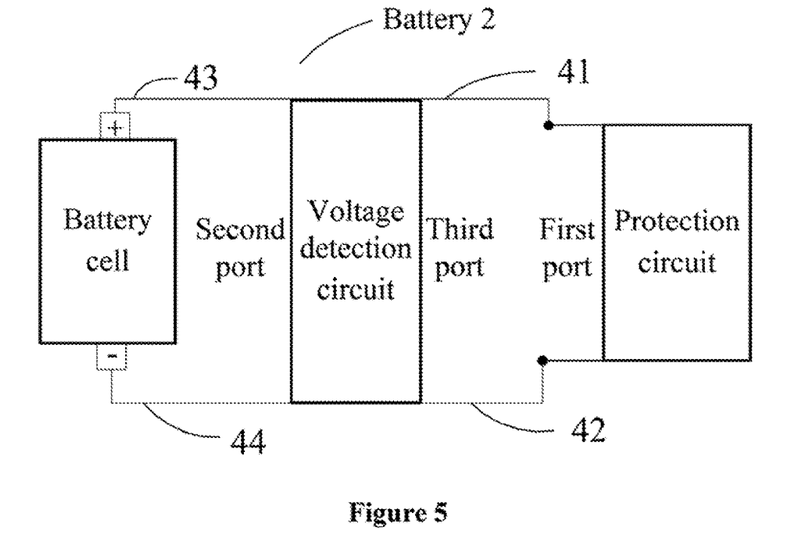
FIG. 5 illustrates a structural diagram of a battery where a third conductive wire in the battery is a portion of a first conductive wire consistent with disclosed embodiments.

In one embodiment, referring to FIG. 4, the first conductive wire 41, the second conductive wire 42, the third conductive wire 43, and the fourth conductive wire 44 may be four independent conductive wires. In another embodiment, referring to FIG. 5, the third conductive wire 43 may be a portion of the first conductive wire 41, and the fourth conductive wire 44 may be a portion of the second conductive wire 42. In this case, the voltage detection circuit 22 may be directly connected between the battery cell 21 and the protection circuit 23 in parallel. The wire segment from the anode of the battery cell 21 to the first port of the protection circuit 23 may refer to the first conductive wire 41, while the wire segment from the anode of the battery cell 21 to the second port of the voltage detection circuit 22 may refer to the third conductive wire 43, thus, the third conductive wire 43 may be a portion of the first conductive wire 41. Correspondingly, the second conductive wire 42 and the fourth conductive wire 44 can be referred to a similar method, and are not discussed herein.

Figure 6:
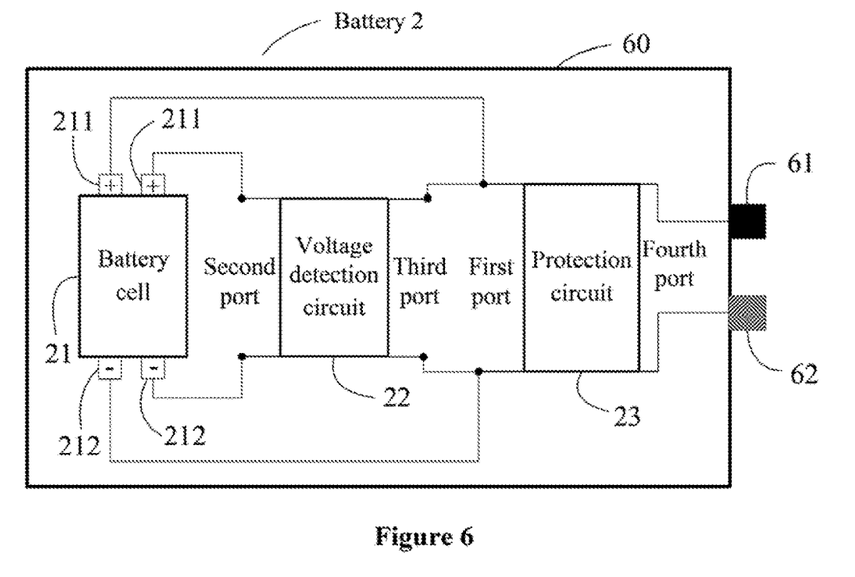
FIG. 6 illustrates a structural diagram of a battery including a battery anode and a battery cathode consistent with disclosed embodiments.

Further, referring to FIG. 6, the battery 2 may also include a battery case 60 for encapsulating the battery cell 21, the voltage detection circuit 22 and the protection circuit 23 to protect the internally enclosed circuit modules. The battery case 60 may be made of an insulating material.

In one embodiment, the voltage detection circuit 22 and the protection circuit 23 may be first integrated, and then may be placed into the battery case 60. In other words, the voltage detection circuit 22 and the protection circuit 23 may be two independent circuit modules, or may be integrated into one circuit module. The integrated one circuit module may refer to a circuit protection board, or a protection board.

Referring to FIG. 6, the battery 2 may also include a battery anode 61 and a battery cathode 62, and the battery anode 61 and the battery cathode 62 may be directly disposed outside the battery case 60. In other words, two openings may be directly opened on side of the battery case 60, for example, the openings may be opened on the same side of the battery case 60 or may be opened on different sides of the battery case 60, and then the battery anode 61 and the battery cathode 62 may be directly accommodated in the two openings. As a result, the electrical signal of the battery 2 may be directly transmitted to the outside of the battery case 60 through the battery anode 61 and the battery cathode 62, for example, the current of the battery cell 21 may be directly transmitted to the battery anode 61 and the battery cathode 62.

In one embodiment, the protection circuit 23 may also include a fourth port. The fourth port may be connected between the battery anode 61 and the battery cathode 62 to facilitate charging the battery 2 by, for example, a direct contact between a charger interface or alike parts and the battery anode 61 as well as the battery cathode 62.

At the same time, when the battery 2 is used in an electronic device, the battery anode 61 and the battery cathode 62 included in the battery 2 may be directly connected to the electronic device, for example, may be directly connected to a power management unit in the electronic device. As a result, the current of the battery cell 21 may be directly transmitted to the electronic device through the battery anode 61 and the battery cathode 62 to supply power for the electronic device and, thus, the electronic device can operate normally.

Figure 7:
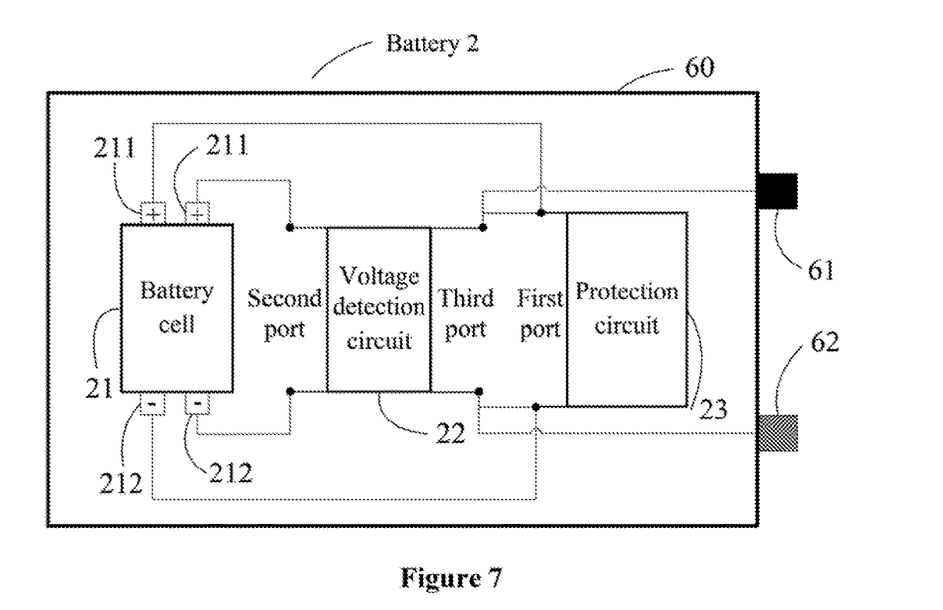
FIG. 7 illustrates a structural diagram of another battery including a battery anode and a battery cathode consistent with disclosed embodiments.

Referring to FIG. 7, the third port of the voltage detection circuit 22 may be directly connected between the battery anode 61 and the battery cathode 62. With this connection, the voltage detection circuit 22 can directly transmit the detected voltage of the battery cell 21 to the battery anode 61 and the battery cathode 62, thus, the voltage of the battery cell 21 can be obtained by directly measuring the potential difference between the battery anode 61 and the battery cathode 62. Because the battery cell 21 may be generally disposed inside the battery case 60, the voltage of the battery cell 21 may be directly detected from the outside of the battery 2.

The battery 2 in various embodiments may include the battery cell 21, the voltage detection circuit 22 and the protection circuit 23. The battery cell 21 may include at least one anode 211 of the battery cell and at least one cathode 212 of the battery cell. The voltage detection circuit 22 may be used to detect the voltage of the battery cell 21. The protection circuit 23 may be used to protect the battery cell 21 based on the voltage of the battery cell 21 detected by the voltage detection circuit 22. The protection circuit 23 may include the first port, and the first port may be connected between the first anode 211 of the battery cell and the first cathode 212 of the battery cell. Thus, the battery cell 21 may be charged through the protection circuit 23, or the battery cell 21 may be discharged to the loads through the protection circuit 23.

In addition, the voltage detection circuit 22 may include the second port and the third port. The second port may be connected between the second anode 211 of the battery cell and the second cathode 212 of the battery cell, and the third port may be connected to the first port of the protection circuit 23. Because the second port of the voltage detection circuit 22 is directly connected between the second anode 211 of the battery cell and the second cathode 212 of the battery cell, and there is no other electronic components between the battery cell 21 and the voltage detection circuit 22, the potential difference between the second anode 211 of the battery cell and the second cathode 212 of the battery cell detected by the voltage detection circuit 22 may be the actual voltage of the battery cell 21. In other words, the voltage detection circuit 22 can accurately detect the actual voltage of the battery cell 21, and the accuracy of the detection of the voltage of the battery cell 21 may be improved.

Further, because the detection result of the voltage of the battery cell 21 is more accurate, the control of the fast charging process based on the voltage of the battery cell 21 may be more accurate. Because there is no voltage division of other electronic components between the battery cell 21 and the voltage detection circuit 22, compared to the case where there are other electronic components between the battery cell 21 and the voltage detection circuit 22, the voltage value detected by the voltage detection circuit 22 may be smaller. As a result, the stopping of the fast charging process may be delayed to fully use the fast charging capability of the battery 2, thus, the charging efficiency may be improved.

Figure 8:
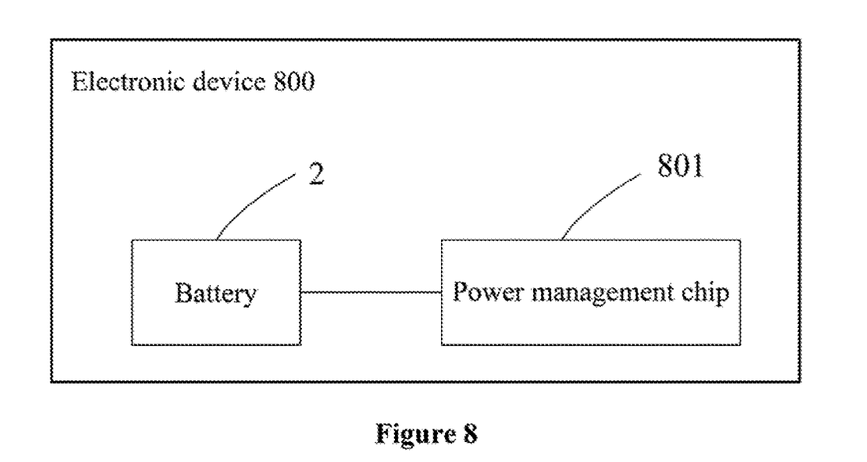
FIG. 8 illustrates a structural diagram of an electronic device consistent with disclosed embodiments.

An electronic device is also provided. Referring to FIG. 8, an electronic device 800 is provided. The electronic device 800 may include a battery 2 shown in any one of FIGS. 2-7, and a power management chip 801. In other words, the electronic device 800 may include any one battery 2 described above and the power management chip 801.

The power management chip 801 may be connected to the battery 2, and be used to determine the voltage detected by the voltage detection circuit 22 included in the battery 2 as the voltage of the battery 2.

In one embodiment, the power management chip 801 may be directly connected to the third port of the voltage detection circuit 22 through a conductive wire. Alternatively, the power management chip 801 may be directly connected to the first port or the fourth port of the protection circuit 23 through a conductive wire. Alternatively, the power management chip 801 may be directly connected to the battery anode 61 as well as the battery cathode 62 of the battery 2 through a conductive wire. The specific connection method between the power management chip 801 and the battery 2 may not be limited.

In addition, the electronic device 800 may also include a case, a processor, a storage device, a camera, a touch display screen, and a speaker, etc. The power consumed by the device components, such as the processor, the camera, and the touch display screen, may be provided by the battery 2.

In one embodiment, the processor may be a general-purpose central processing unit (CPU), or an application specific integrated circuit (ASIC). In certain embodiments, the processor may also be one or more integrated circuits (ICs) used to control the execution of programs. The storage devices may include read only memory (ROM), random access memory (RAM), magnetic disks, etc. The number of the storage devices may be one or more than one.

Optionally, after determining that the voltage of the battery 2 is larger than or equal to a first voltage threshold, for example, after determining the voltage of the battery 2 is larger than or equal to 4.2 volts, the power management chip 801 may also be used to control disconnection of the charging circuit for charging the battery 2 to avoid overcharge.

Optionally, after determining that the voltage of the battery 2 is smaller than or equal to a second voltage threshold, for example, after determining the voltage of the battery 2 is smaller than or equal to 0.5 volt, to avoid excessive use of the battery cell 21 of the battery 2, the power management chip 801 may also be used to control disconnection of the discharging circuit of the battery 2 for supplying current to the loads to avoid over-discharge.

Because the power management chip 801 may directly determine the voltage of the battery cell 21 detected by the voltage detection circuit 22 of the battery 2 as the voltage of the battery 2, in other words, the actual voltage of the battery cell 21 may be directly obtained through the battery 2, the detection and control of the overcharge and over-discharge may be more accurate, thus the fast charging capacity of the battery 2 may be used as much as possible to improve the performance of the battery 2.

For illustration purposes, the disclosed methods and electronic devices are described based on the division of various functions of the modules. In actual applications, the various functions described above may be realized by different functional modules based on actual needs. That is, the internal structure of the electronic device may be divided into different functional modules in order to realize all or a part of the functions. The specific operation procedures of the systems, devices, and units described above may be referred to the corresponding description illustrated in the above embodiments.

The system, device and method described in the above embodiments may be realized through other approaches. That is, the description on the methods and devices in the above embodiments may only be schematic examples. For instance, the modules or units may be merely defined based on their logical functions, and in actual applications, the modules or units may be defined based on other criteria. For example, multiple units or components may be combined together or be integrated into another system, or some features may be ignored or may not be executed. Moreover, the coupling between the modules, units, and components illustrated or discussed above may be direct coupling or communication connections through some indirect coupling or communication connections between interfaces, devices, or units. The coupling may be electrical, mechanical, or in any other appropriate form.

The modules or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments. The storage media may include U disk, mobile hard disk, read-only memory (ROM), random access memory (RAM), magnetic disk, optical disk, or any other appropriate media that can be used to store program code.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A battery, comprising:
    a battery cell, including at least one anode of the battery cell and at least one cathode of the battery cell;
    a voltage detection circuit, wherein the voltage detection circuit detects a voltage of the battery cell; and
    a protection circuit, wherein the protection circuit protects the battery cell based on the voltage of the battery cell detected by the voltage detection circuit;
    wherein:
        the protection circuit includes a first port;
        the voltage detection circuit includes a second port and a third port;
        the first port of the protection circuit is connected between a first anode of the battery cell and a first cathode of the battery cell;
        the second port of the voltage detection circuit is connected between a second anode of the battery cell and a second cathode of the battery cell; and
        the third port of the voltage detection circuit is connected to the first port of the protection circuit.

2. The battery according to claim 1, wherein:
    in response to the voltage value of the battery cell reaching a certain value, the protection circuit performs a control on a charging current based on the voltage of the battery cell.

3. The battery according to claim 1, wherein:
    in response to the voltage value of the battery cell reaching a certain value, the protection circuit performs a control on a discharging current and stops the battery cell from outputting current to loads in advance based on the voltage of the battery cell.

4. The battery according to claim 1, wherein:
the first anode of the battery cell is the same as the second anode of the battery cell; and
the first cathode of the battery cell is the same as the second cathode of the battery cell.

5. The battery according to claim 1, wherein:
the first anode of the battery cell is the same as the second anode of the battery cell; and
the first cathode of the battery cell is different from the second cathode of the battery cell.

6. The battery according to claim 1, wherein:
the first anode of the battery cell is different from the second anode of the battery cell; and
the first cathode of the battery cell is the same as the second cathode of the battery cell.

7. The battery according to claim 1, wherein:
a first terminal of the first port of the protection circuit is connected to the first anode of the battery cell through a first conductive wire; and
a second terminal of the first port of the protection circuit is connected to the first cathode of the battery cell through a second conductive wire.

8. The battery according to claim 7, wherein:
a first terminal of the second port of the voltage detection circuit is connected to the second anode of the battery cell through a third conductive wire; and
a second terminal of the second port of the voltage detection circuit is connected to the second cathode of the battery cell through a fourth conductive wire.

9. The battery according to claim 8, wherein:
the third conductive wire is a portion of the first conductive wire; and
the fourth conductive wire is a portion of the second conductive wire.

10. The battery according to claim 9, wherein:
the first conductive wire, the second conductive wire, the third conductive wire, and the fourth conductive wire are made of a same conductive material.

11. The battery according to claim 1, further including:
a battery case, for encapsulating the battery cell, the voltage detection circuit, and the protection circuit, wherein the battery case is made of an insulating material.

12. The battery according to claim 1, further including:
a battery anode; and
a battery cathode.

13. The battery according to claim 12, wherein:
the protection circuit includes a fourth port;
the fourth port is connected between the battery anode and the battery cathode; and
the third port of the voltage detection circuit is connected between the battery anode and the battery cathode.

14. An electronic device, comprising:
a battery including:
 a battery cell, including at least one anode of the battery cell and at least one cathode of the battery cell;
 a voltage detection circuit used to detect a voltage of the battery cell; and
 a protection circuit used to protect the battery cell based on the voltage of the battery cell detected by the voltage detection circuit;
 wherein:
  the protection circuit includes a first port;
  the voltage detection circuit includes a second port and a third port;
  the first port of the protection circuit is connected between a first anode of the battery cell and a first cathode of the battery cell;
  the second port of the voltage detection circuit is connected between a second anode of the battery cell and a second cathode of the battery cell; and
  the third port of the voltage detection circuit is connected to the first port of the protection circuit; and
a power management chip, connected to the battery and for determining voltage detected by the voltage detection circuit as voltage of the battery.

15. The electronic device according to claim 14, further including:
a case;
a processor; and
a storage device.

16. The electronic device according to claim 14, wherein the power management chip is for:
determining that the voltage of the battery is larger than or equal to a first preset voltage threshold; and
controlling disconnection of a charging circuit for charging the battery.

17. The electronic device according to claim 14, wherein the power management chip is for:
determining that the voltage of the battery is smaller than or equal to a second preset voltage threshold; and
controlling disconnection of a discharging circuit of the battery for supplying current to loads.

* * * * *